United States Patent
Caspi et al.

(10) Patent No.: US 7,917,582 B2
(45) Date of Patent: Mar. 29, 2011

(54) METHOD AND APPARATUS FOR AUTOCORRELATION OF INSTANT MESSAGES

(75) Inventors: Rami Caspi, Sunnyvale, CA (US); William J. Beyda, Cupertino, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 989 days.

(21) Appl. No.: 10/900,701

(22) Filed: Jul. 27, 2004

(65) Prior Publication Data
US 2006/0026252 A1 Feb. 2, 2006

(51) Int. Cl.
*G06F 15/16* (2006.01)

(52) U.S. Cl. ......... 709/204; 709/219; 370/545; 715/751

(58) Field of Classification Search .................. 709/204, 709/207, 227, 219; 715/751, 842; 370/545
See application file for complete search history.

(56) References Cited

U.S. PATENT DOCUMENTS

| | | | |
|---|---|---|---|
| 5,689,511 A * | 11/1997 | Shimazaki et al. ........... 370/545 |
| 6,754,707 B2 * | 6/2004 | Richards et al. ............. 709/227 |
| 7,127,685 B2 * | 10/2006 | Canfield et al. .............. 715/842 |
| 7,269,793 B2 * | 9/2007 | Horsfall et al. ............... 715/751 |
| 2002/0099775 A1 | 7/2002 | Gupta et al. | |
| 2003/0001890 A1 * | 1/2003 | Brin .............................. 345/753 |
| 2003/0014490 A1 | 1/2003 | Bates et al. | |
| 2003/0023684 A1 | 1/2003 | Brown et al. | |
| 2003/0025729 A1 * | 2/2003 | Davis ........................... 345/753 |
| 2003/0110227 A1 | 6/2003 | O'Hagan | |
| 2003/0131055 A1 | 7/2003 | Yaschin et al. | |
| 2004/0068567 A1 * | 4/2004 | Moran et al. .................. 709/227 |
| 2004/0083269 A1 | 4/2004 | Cummins | |
| 2004/0098469 A1 * | 5/2004 | Kindo et al. .................. 709/219 |
| 2004/0225716 A1 * | 11/2004 | Shamir et al. ................. 709/204 |
| 2005/0021652 A1 * | 1/2005 | McCormack ................ 709/207 |
| 2005/0066365 A1 * | 3/2005 | Rambo ........................... 725/51 |

FOREIGN PATENT DOCUMENTS

EP 1339001 A2 8/2003

* cited by examiner

*Primary Examiner* — Tammy T Nguyen

(57) ABSTRACT

A text chat messaging system in which messages are displayed in chronological order on a message-by-message basis according to chat participants includes a messaging server (102); and a plurality of network clients (104) defining said chat participants and configured to identify messages (204) in a chat session according to chat participants and arrange said chat session for display according to a conversation order of participation in said chat session.

13 Claims, 9 Drawing Sheets

|     | AC |   |   |   |   |   |
|-----|----|---|---|---|---|---|
| User | Text | | | | 201 | Time |
| A | Shall I compare thee to a Summer's day? | | | | | 1 |
| B | Thou are more lovely and more temperate: | | | | | 2 |
| B | And Summer's lease hath all too short a date: | | | | | 3 |
| A | Rough winds do shake the darling buds of May, | | | | | 4 |
| A | Sometime too hat the eye of heaven shines, | | | | | 5 |
| B | And often is his gold complexion dimm'd; | | | | | 6 |
| A | And every fair from fair sometime declines, | | | | | 7 |
| B | By chance or nature's changing course untrimm'd: | | | | | 8 |

FIG. 2A

|     | AC |   |   |   |   |   |
|-----|----|---|---|---|---|---|
| A | Shall I compare thee to a Summer's day? | | | | | 1 |
| B | Thou are more lovely and more temperate: | | | | | 2 |
| A | Rough winds do shake the darling buds of May, | | | | | 4 |
| B | And Summer's lease hath all too short a date: | | | | | 3 |
| A | Sometime too hat the eye of heaven shines, | | | | | 5 |
| B | And often is his gold complexion dimm'd; | | | | | 6 |
| A | And every fair from fair sometime declines, | | | | | 7 |
| B | By chance or nature's changing course untrimm'd: | | | | | 8 |

FIG. 2B

METHOD AND APPARATUS FOR AUTOCORRELATION OF INSTANT MESSAGES

BACKGROUND OF THE INVENTION

1. Field of the Invention

The present invention is directed generally to telecommunications systems and, particularly, to improvements in providing instant messaging information.

2. Description of the Related Art

Instant messaging is becoming an increasingly popular mode of communication. In instant messaging systems, users are provided with instant messaging client software, which allows them to communicate via an instant messaging server with other instant messaging users.

During an instant messaging session (referred to as a 'chat'), a user types a brief message, then transmits it to the server, which passes it on the other participants in the chat. The messages are typically displayed in a client window on each client device according to chronological order in real time.

When involved in a chat session, one party may type faster than another party. In such a case, it is easy for one person to reply to one answer and type another, while the first person is still answering the first reply. As can be appreciated, even though the user interface at the client displays the messages in chronological order, the messages will no longer be synchronized.

This can lead to confusion in carrying out an ongoing communication as well as difficulty in reading a stored log of the chat.

As such, there is a need for an improved system and method for instant messaging. There is a further need for an improved method for displaying an instant messaging chat session.

SUMMARY OF THE INVENTION

These and other drawbacks in the prior art are overcome in large part by a system and method according to embodiments of the present invention.

A text chat messaging system in which messages are displayed in chronological order on a message-by-message basis according to chat participants, according to an embodiment of the present invention, includes a messaging server; and a plurality of network clients defining said chat participants and configured to identify messages in a chat session according to chat participants and arrange said chat session for display according to a conversation order of participation in said chat session. In certain embodiments, the plurality of network clients are adapted to transmit to others of said plurality one or more indicia of a new ordering of said chat session display. In others, plurality of network clients are adapted to transmit to said messaging server one or more indicia of a new ordering of said chat session display.

A text messaging system according to an embodiment of the present invention is configured to identify from a chronological ordering of a chat session a "conversation" order and re-order a display or log of the chat in the conversation order. In operation, an autocorrelation client control unit according to embodiments of the present invention reads time stamps and sender identification on messages associated with a chat. The autocorrelation client control unit then determines if there are consecutive messages by the same user. If so, then it will be bumped down after the next message from the other party to the chat session.

A method for use in a text chat messaging system in which messages are displayed in chronological order on a message-by-message basis according to chat participants includes identifying messages in a chat session according to said chat participants; determining an order of initial participation by said chat participants in said chat session; and arranging a record of said chat session in said order of initial participation. The record may be either a log or an ongoing chat session.

A method for use in a text chat messaging system in which messages are displayed in chronological order on a message-by-message basis according to chat participants includes identifying messages in a chat session according to chat participants; determining if consecutive messages are from same chat participants; inserting a next message by a different chat participant between said consecutive messages; and displaying said chat session after said inserting.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 2A and FIG. 2B illustrate operation of an embodiment of the present invention;

DETAILED DESCRIPTION OF EMBODIMENTS OF THE INVENTION

Figure 1:
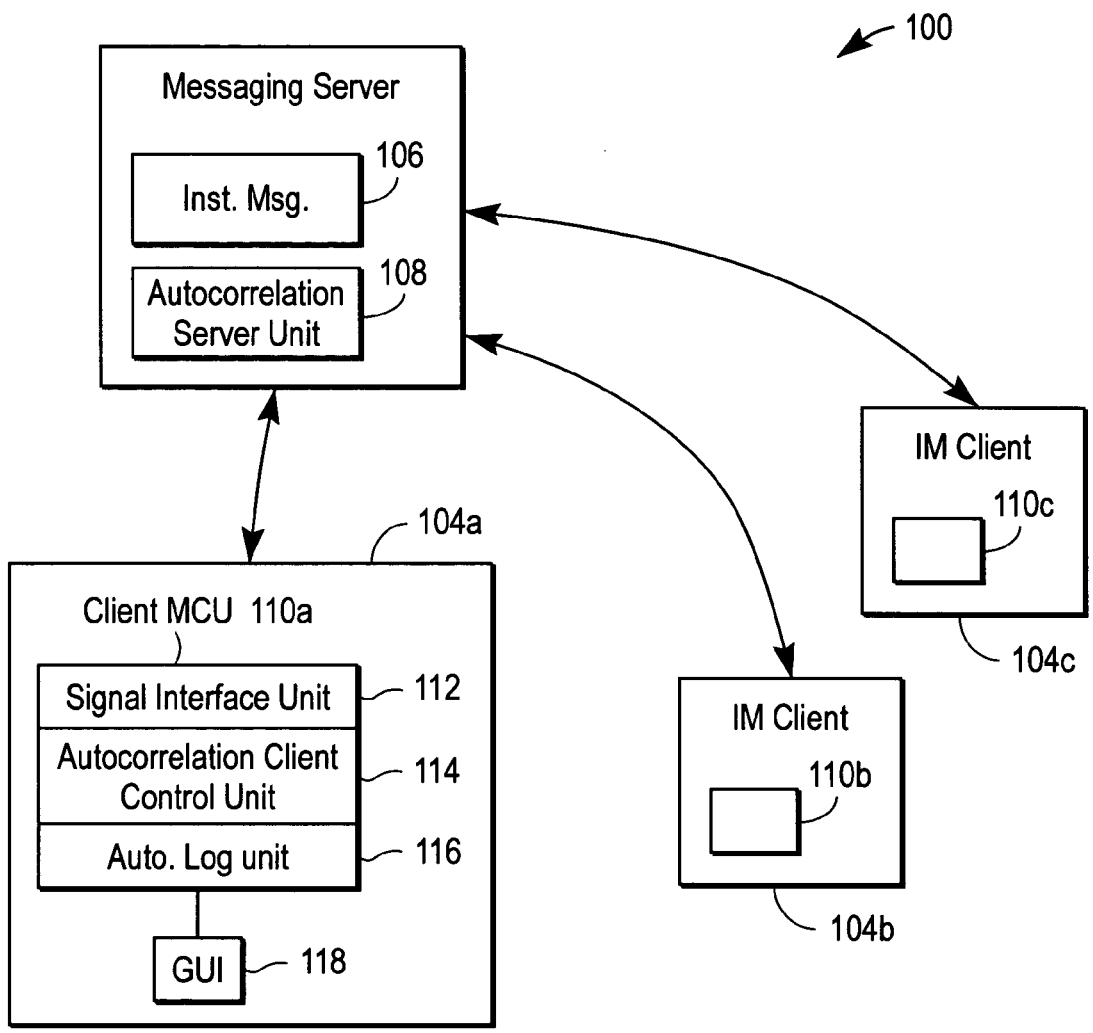
FIG. 1 is a diagram schematically illustrating a messaging system according to embodiments of the present invention.

Turning now to the drawings and, with particular attention to FIG. 1, a diagram schematically illustrating a messaging system according to an embodiment of the present invention is shown and generally identified by the reference numeral 100. The system 100 includes a messaging server 102 and a plurality of messaging clients 104a-104c. In the embodiment illustrated, the messaging system 100 is implemented as an Instant Messaging system. It is noted, however, that the system 100 could be implemented as any text-based chat-type system, such Microsoft Instant Messenger, AOL Instant Messenger, or a web-browser based chat system.

The messaging server 102 includes an instant messaging control unit 106 and, in certain embodiments, an autocorrelation server unit 108. The messaging clients 104a-104c include client messaging control units 110a-110c. In addition, in the embodiments illustrated, the client messaging control units 110 include a signal interface unit 112 for transmitting and receiving messaging signals, an autocorrelation client control unit 114, and an auto-log unit 116. In addition, the messaging clients 104a-104c include graphical user interface 118 for display of the chat session(s) and/or logs.

As will be explained in greater detail below, the signal interface unit 112 receives the respective messaging signals from the messaging server 102 and provides the signals to the graphical user interface 118 for display. In addition, the signals may be provided to the auto-log unit 116 for storage, and to the autocorrelation client control unit 114. As will be explained in greater detail below, the autocorrelation control unit 114 is responsive to commands received via the graphical user interface 118 to correlate incoming messages for improved user control.

More particularly, operation of embodiments of the present invention are illustrated in FIGS. 2A and 2B by way of example. Shown is an exemplary graphical user interface window 200 showing a chat session or chat log 201, including a plurality of sequenced messages, and an autocorrelation control 203. Each message includes a user identification, a text message, and may also include a time stamp portion.

In particular, the window 200 displays current users or parties 202 (User A and User B) to the chat 201, as well as the text of messages 204 each user has sent. In addition, the system may maintain a time stamp 206 for each message. The time stamp may be a real-time stamp or a relative time stamp, as illustrated. The time stamp may or may not be displayed. However, as can be seen, the parties and messages are displayed according to the chronological order of time stamp, that is, according to when the message arrived at the server (Typically, in operation, a message is displayed as soon as it is uploaded). As can be appreciated, this can result in the messages being displayed in an incorrect order. For example, as illustrated, a message from user A 202a is shown; then a message 202b from user B. The next line, of course, should be user A's message 202d. However, for any of a variety of reasons, the message 202c from user B arrives first. As such, it is typically displayed first.

Responsive to activating (e.g., clicking) the control 203, an autocorrelation client control unit 114 according to embodiments of the present invention will determine a correlated sequence for a "conversational" ordering of the display of the chat session. An exemplary correlated sequence is shown in FIG. 2B. As will be explained in greater detail below, when the display is seen to be out of synchronization, the user can elect an autocorrelation display option. This causes the autocorrelation client control unit 114 to examine the received messages and arrange them according to the appropriate correlated sequence. As shown, this order is 202a, 202b, 202d, 202c.

This may be done, for example, by determining which party went first and then alternating the messages based on users. Alternatively, the system could identify consecutive messages having a same user and "move up" the next message by the other user.

For example, with reference to FIG. 2A and FIG. 2B, in one embodiment, in response to receipt of the autocorrelate command, the autocorrelation client control unit 114 will determine which party to a chat session "spoke" first, i.e., an order of initial participation; in the example of FIG. 2A, the autocorrelation client control unit 114 will read the first user identification of message 202, to determine that user A spoke first. The autocorrelation client control unit 114 will then arrange the session in an alternating sequence such that user A's messages are displayed in the order received, and user B's messages will be interleaved, but also in the order in which they were received.

Thus, for example, the autocorrelation client control unit 114 will determine from the time stamps 206 that user A's messages were delivered in order of 202a, 202d, 202e, 202g and that user B's messages were delivered in order 202b, 202c, 202f, 202h. The autocorrelation client control unit 114 will then order the messages sequentially by user, but alternating user A and user B's messages. That is, the autocorrelation client control unit 114 will arrange the messages and cause the GUI to display the first message from user A, then the first message from user B; then the second message from user A, the second message from user B, and so on.

In another embodiment, the autocorrelation client control unit 114 will read the user identifications 202 on the selected chat session and determine if there are any sequential messages, i.e., if a same user has two consecutive messages. This may be done, for example, by reading time signatures 206 and determining that pairs of closest time signatures are associated with the same user. For example, in FIG. 2A, the autocorrelation client control unit 114 would determine that messages 202b, 202c are from the same user, and messages 202d, 202e are from the same user. Because messages 202b, 202c are from the same user, the autocorrelation client control unit will identify the next message from the other user (in this case 202d) and move it up or insert it between messages 202b and 202c. The autocorrelation client control unit will then proceed similarly with the remaining messages. It is noted that, while described above with reference to two participants, the above discussion is easily extendible to chat sessions involving more than two participants.

The sequencing can be done while the chat session has been stored (i.e., after the fact, in the autolog), or on a line-by-line ongoing basis while the user in on-line (i.e., engaged in a chat). In this case, the chat record window can be "refreshed" on an ongoing basis. That is, typically, a user's message is uploaded and initially displayed in the order received. If it is determined that it is out of conversation order, the screen will be refreshed with the conversation order. If the autocorrelation function is invoked while the user is online, the autocorrelation can be performed on the user side only; via an exchange of messages between both users; or via an exchange of messages with the server.

Figure 3:
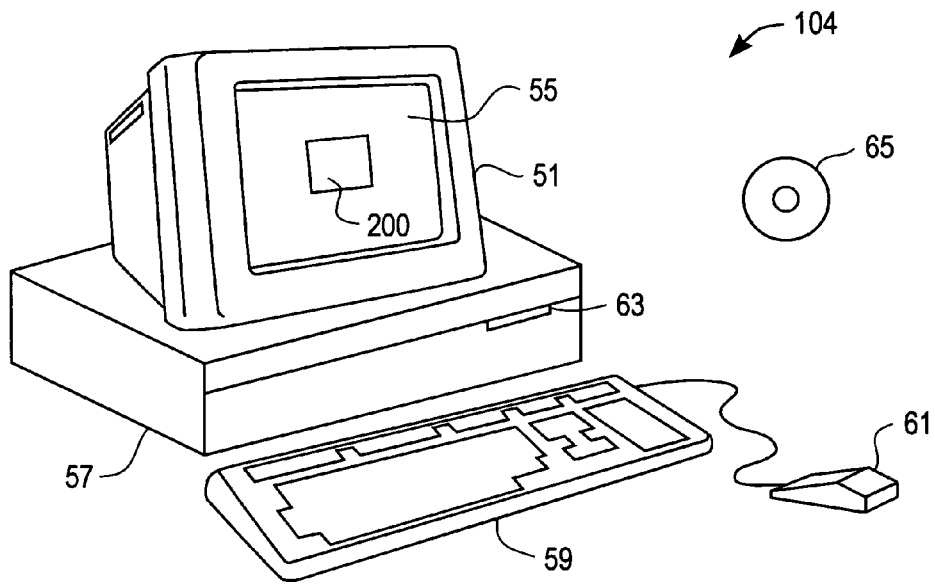
FIG. 3 and FIG. 4 illustrate a computer system according to an embodiment of the present invention.

FIG. 3 illustrates an example of a computer system messaging client or client endpoint 104 that can be used to execute software embodiments of the invention. In particular, FIG. 3 shows a computer system 104 that includes a display 51, screen 55, cabinet 57, keyboard 59, and mouse 61. Mouse 61 can have one or more buttons for interacting with a graphical user interface (GUI), such as GUI 200 (FIG. 2). Cabinet 57 houses a CD-ROM drive 63, system memory and a hard drive (see FIG. 4) which can be utilized to store and retrieve software programs incorporating computer code that implements aspects of the invention, data for use with the invention, and the like. Although CD-ROM 65 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 4:
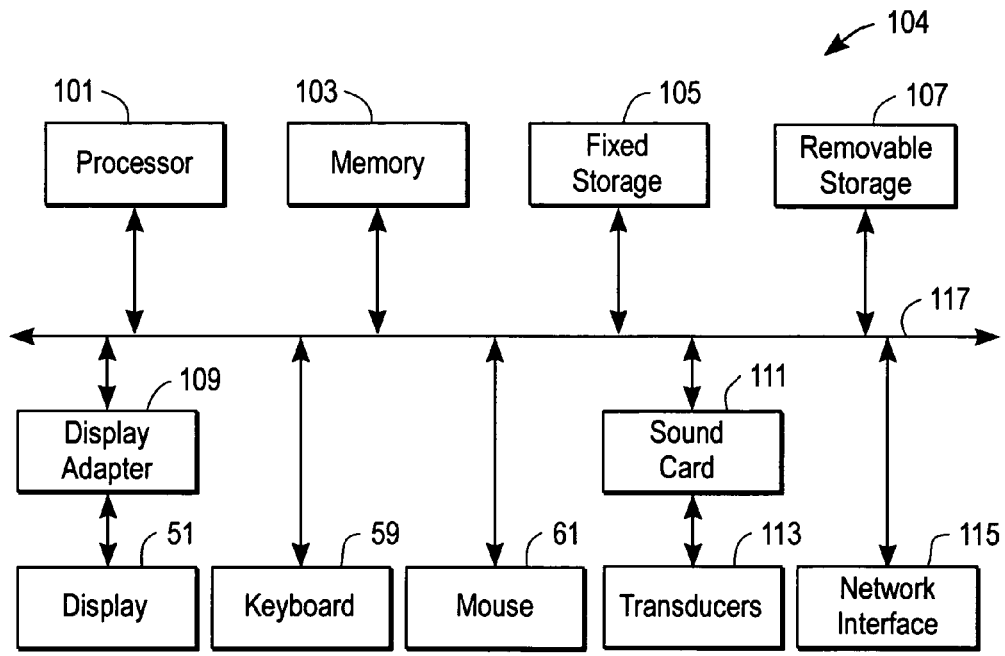

FIG. 4 shows a system block diagram of computer system 104 used to execute software of an embodiment of the invention or use hardware embodiments. As in FIG. 3, computer system 104 includes display 51, keyboard 59, and mouse 61. Computer system 104 further includes subsystems such as a central processor 101, system memory 103, fixed storage 105 (e.g., hard drive), removable storage 107 (e.g., CD-ROM drive), display adapter 109, sound card 111, transducers 113 (speakers, microphones, and the like), and network interface 115. The network interface may provide the communication to the computer telephony network. Other computer systems suitable for use with the invention can include additional or fewer subsystems. For example, another computer system could include more than one processor 101 (i.e., a multi-processor system) or a cache memory.

The system bus architecture of computer system 104 is represented by arrows 117. However, these arrows are illustrative of any interconnection scheme serving to link the subsystems. For example, a local bus could be utilized to connect the central processor to the system memory and/or display adapter. Computer system 104 shown in FIG. 4 is but an example of a computer system suitable for use with the invention. Other computer architectures having different configurations of subsystems can also be utilized. In addition, it is noted that implementations of the messaging server 102 would typically be on a computer system generally similar to computer system 104.

Figure 5:
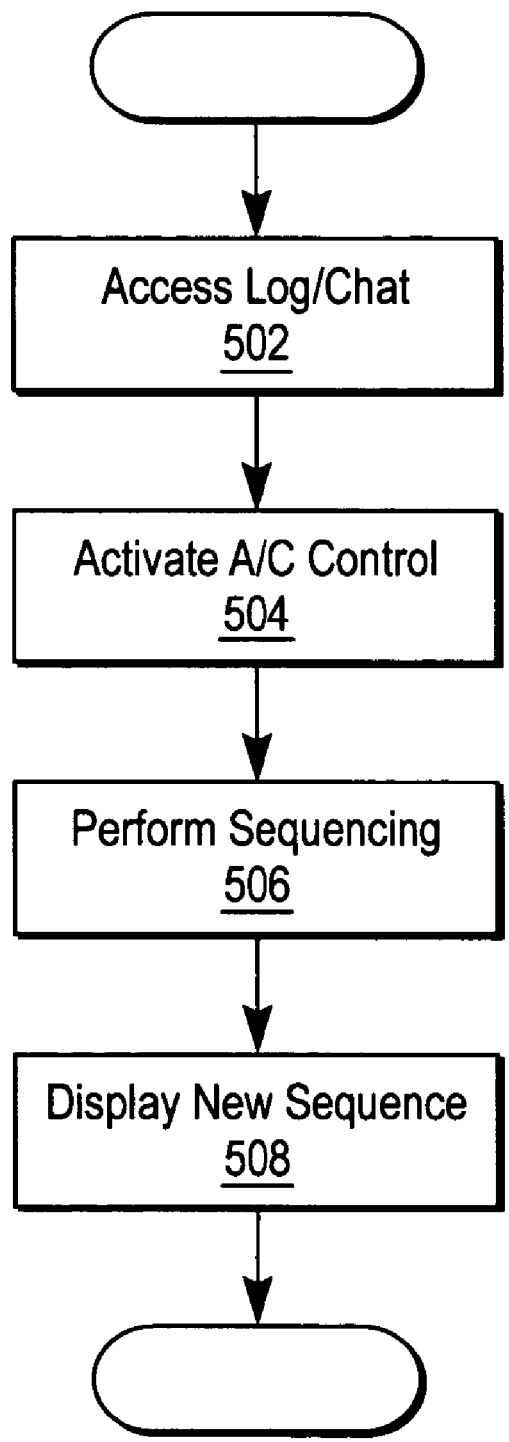
FIG. 5 is a flowchart illustrating operation of an embodiment of the present invention.

Turning now to FIG. 5, a flowchart illustrating operation of an embodiment of the present invention is shown. Initially, at a step 502, a user at a client device 104 can access the chat log or set up a new chat session. This may be done, for example, by accessing the appropriate controls in the graphical user interface using the appropriate chat software. Once the chat session has been accessed, the chat is displayed in a chat window in the user interface, in a step 504. Once the chat is displayed, the user can access the autocorrelation client control unit 114, in a step 506. Again, as noted above, this may be done via one or more control buttons 203 (FIG. 2) on the user interface. Finally, in step 508, the autocorrelation client control unit 114 determines a "conversation" order for the chat and rearranges the entries accordingly. If the chat session is an ongoing one, then the autocorrelation client control unit 114 can analyze each chat message and determine where in sequence it should be displayed.

Figure 6A:
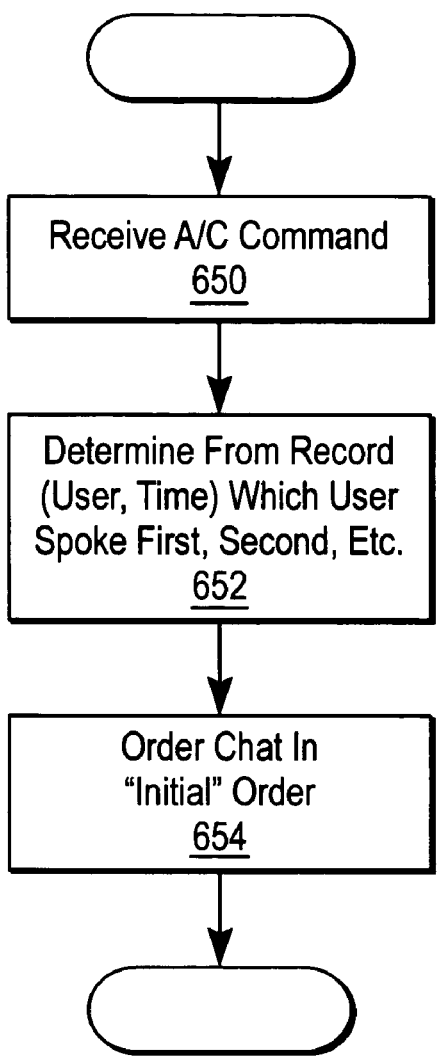
FIG. 6A and FIG. 6B are flowcharts illustrating operation of embodiments of the present invention.
Figure 6B:
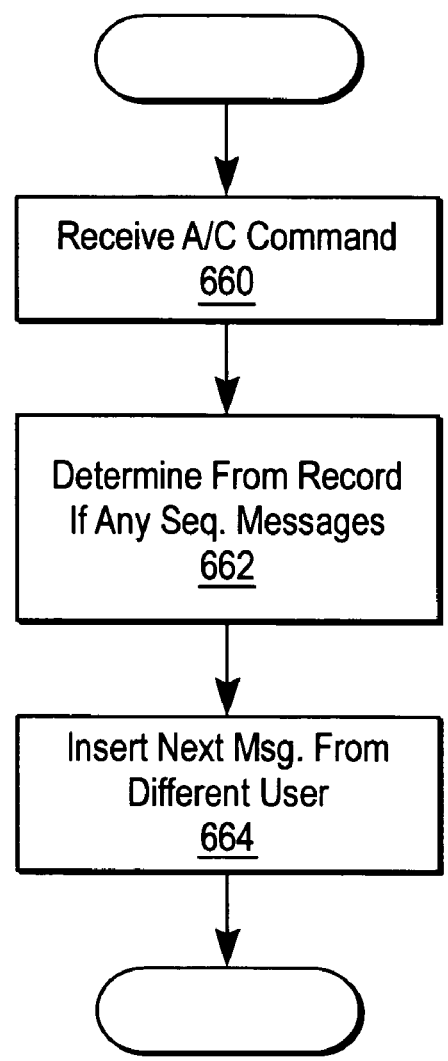

Turning now to FIG. 6A and FIG. 6B, operation of embodiments of the present invention is illustrated. In particular, FIG. 6A and FIG. 6B illustrate a method for determining a conversation order. In FIG. 6A, in a step 650, the activates the autocorrelate function. In a step 652, the autocorrelation client control unit 114 accesses and reads the record (of either a log or an ongoing chat) to determine the order of initial "speaking," i.e., who the first, second, etc., speakers are. For example, this can be accomplished by analyzing the user IDs and the associated time stamps. In a step 654, the system then orders the rest of the chat in same order as the "initial" order. That is, the next posts by each user are arranged for display as if they had been received in the same initial order. Again, this may be determined through examination of the user IDs and the time stamps.

FIG. 6B illustrates an alternate method for performing the autocorrelation. Again, in a step 660, the user activates the autocorrelate function. In a step 662, the system determines from the record whether there are any sequential messages, i.e., consecutive messages from the same user. If sequential messages are identified, then the system inserts the next message from a different user between the two messages from the same user, in a step 664.

Figure 7:
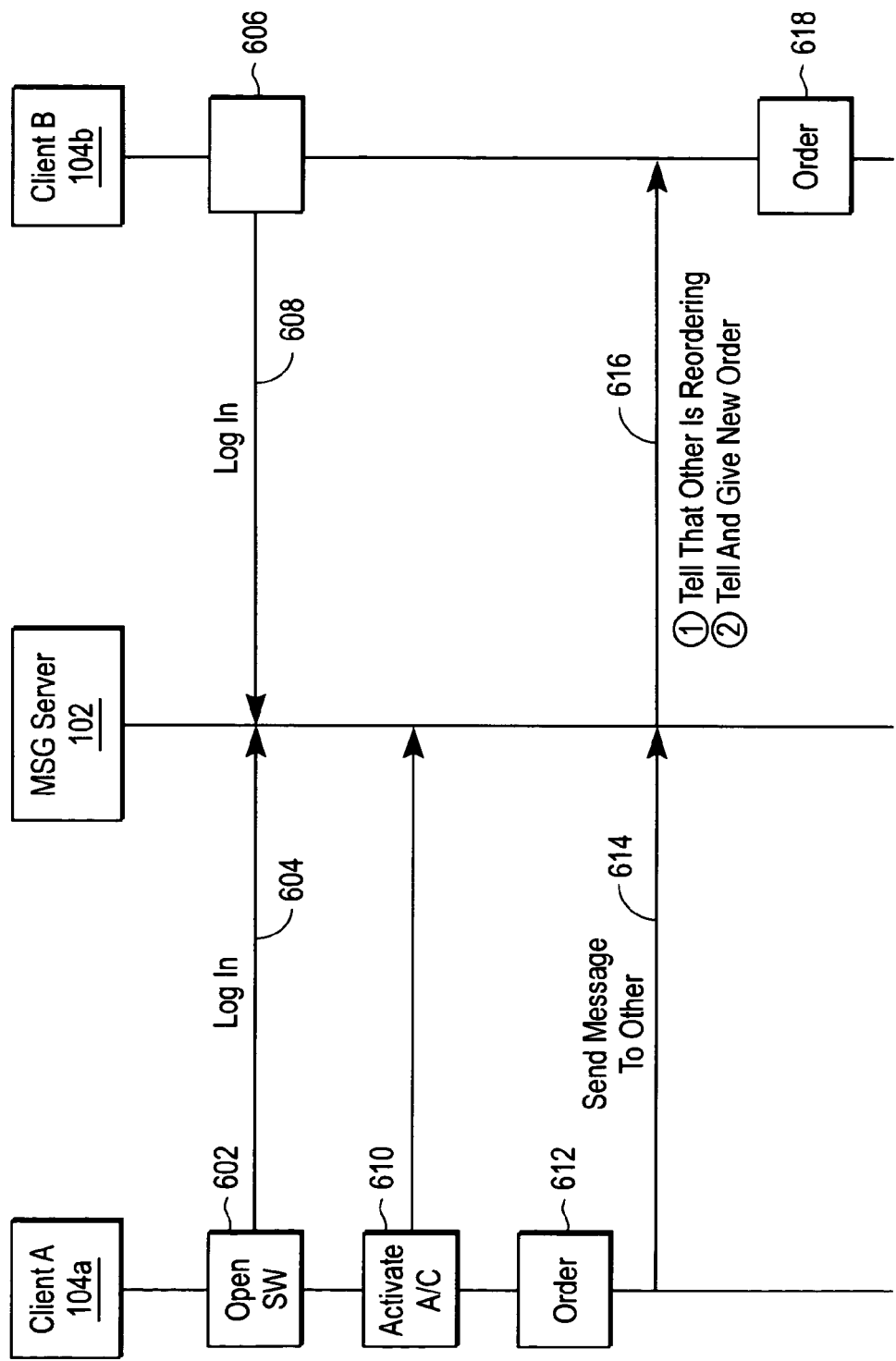
FIG. 7 is a signaling diagram illustrating operation of an embodiment of the present invention.

In addition to providing for a local-only autocorrelation of the chat session or record, embodiments of the present invention allow communication of the new conversation order, or indicia that allow other clients to determine the order themselves. FIG. 7 is a signaling diagram illustrating operation of such an embodiment of the present invention. In particular, in the embodiment of FIG. 7, a client endpoint can activate his autocorrelation client control unit 114 to perform the conversation format conversion and also send one or more signals to another client endpoint so that the conversation format is synchronized.

Shown are a client or user A 104a, a messaging server 102, and a client or user B 104b. Initially, at 602, the Client A opens his chat software to set up a chat session. His chat software sends the appropriate signaling via signal interface unit 112 to the messaging server 102 at 604. Similarly, the Client B can open his software at 606 and register at 608. In the example illustrated, at 610, the user A activates his autocorrelation client control unit 114. As discussed above, this causes the display of the chat session to be re-ordered in conversation order, at 612.

At 614, the autocorrelation client control unit 114 causes the signal interface unit 112 (FIG. 1) to send one or more messages to the server 102 for transmission to the client B, at 616. The other party client endpoint B receives the signaling at 618 and can take one or more ordering actions in response, depending on the embodiment or how the software is configured.

In certain embodiments, the endpoint client B simply receives a signal via its own signal interface unit indicating that the sending party endpoint client A has activated his autocorrelation client interface unit. In this case, the endpoint client B then activates its own autocorrelation client control unit and performs an independent re-ordering of its own display, in a manner similar to that discussed above, into the presumed same conversation order.

In other embodiments, the signaling includes an identification of the conversation order, or at least a designation of the initiating party. The receiving endpoint client B can then base its determination of the order on the received signaling. That is, the endpoint client B will receive the initial order determination from the other party.

In still other embodiments, the receiving endpoint client B can cause the graphical user interface to generate a pop-up window (not shown) to display a presumed conversation order. If acceptable, this can be used instead of or in conjunction with the previous window.

Figure 8:
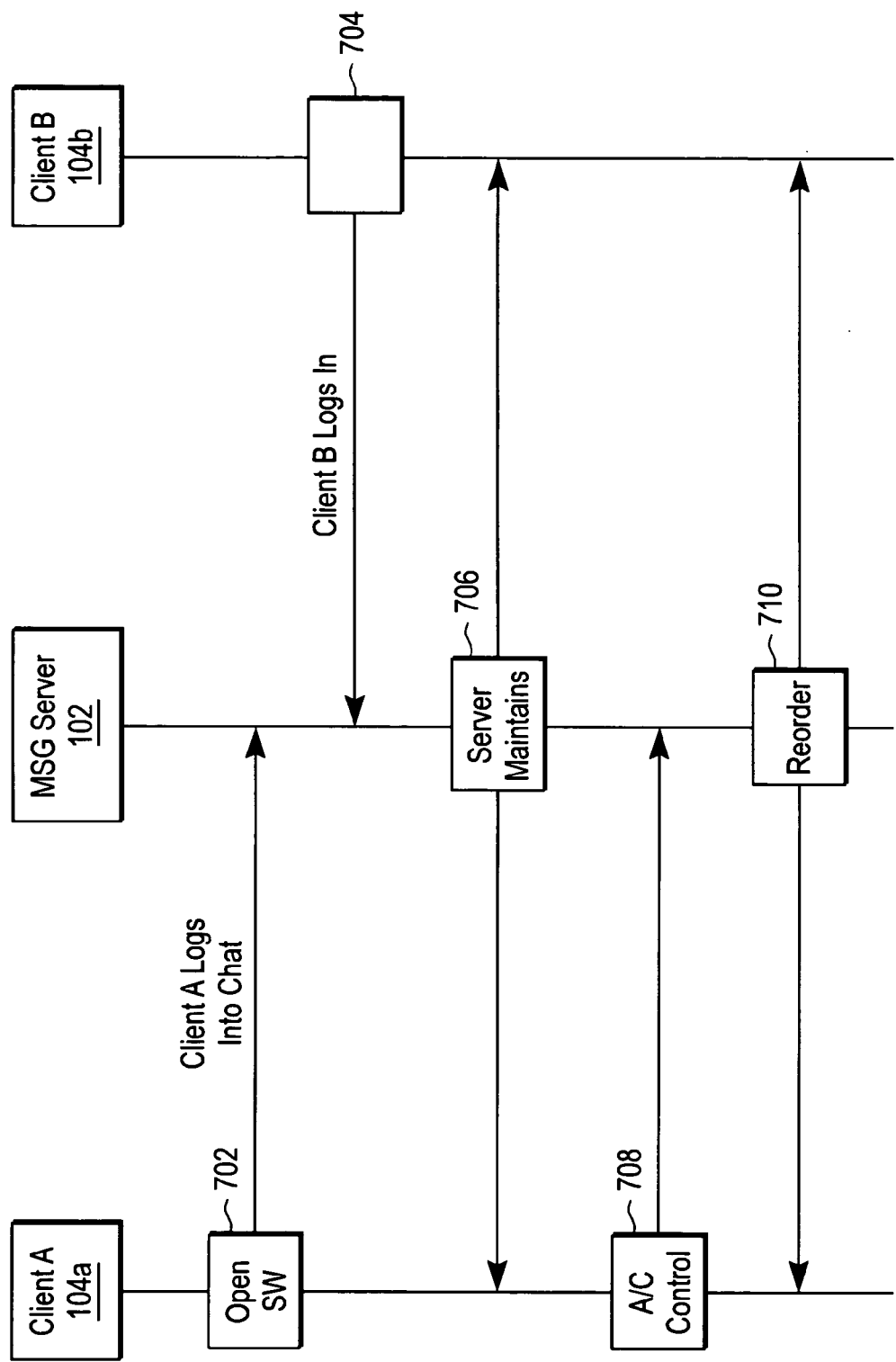
FIG. 8 is a signaling diagram illustrating operation of an embodiment of the present invention.

FIG. 8 illustrates operation of an alternate embodiment of the present invention. In particular, in the embodiment of FIG. 8, the messaging server 102 provides a central repository or autocorrelation server unit 108 (FIG. 1) which functions as one or more of a centralized display, log, and ordering unit. In such an embodiment, the autocorrelation server unit 108 may be implemented as a web browser-type server and the client endpoints can access the chat sessions and logs, etc., via web browser software.

Shown are a client A 104a, a messaging server 102, and a client B 104b. Initially, at 702, the user A logs in with his browser chat software to set up a chat session. Similarly, the user B can open his software and register at 704. At 706, the server 102 maintains a chat session. In the example illustrated, at 708, the user A can select the autocorrelate function. For example, as discussed above, the browser could provide a clickable control.

This causes the server 102's display of the chat session to be re-ordered in conversation order, at 710, in a manner similar to that discussed above. Thus, the display provided to both parties, accessible via their browsers, will be in conversation order.

It is noted, that while a display is typically made of the sender's message as soon as it is uploaded to the server (e.g., in response to the user clicking "enter"), in certain embodiments, the messages can be temporarily buffered at the server and not displayed until the corresponding message from the other user(s) has arrived in the correct order.

As noted above, the teachings of the present invention can be applied to any instant messaging or chat system. One particular environment in which the teachings of the present invention may be applied is shown in FIG. 9.

Figure 9:
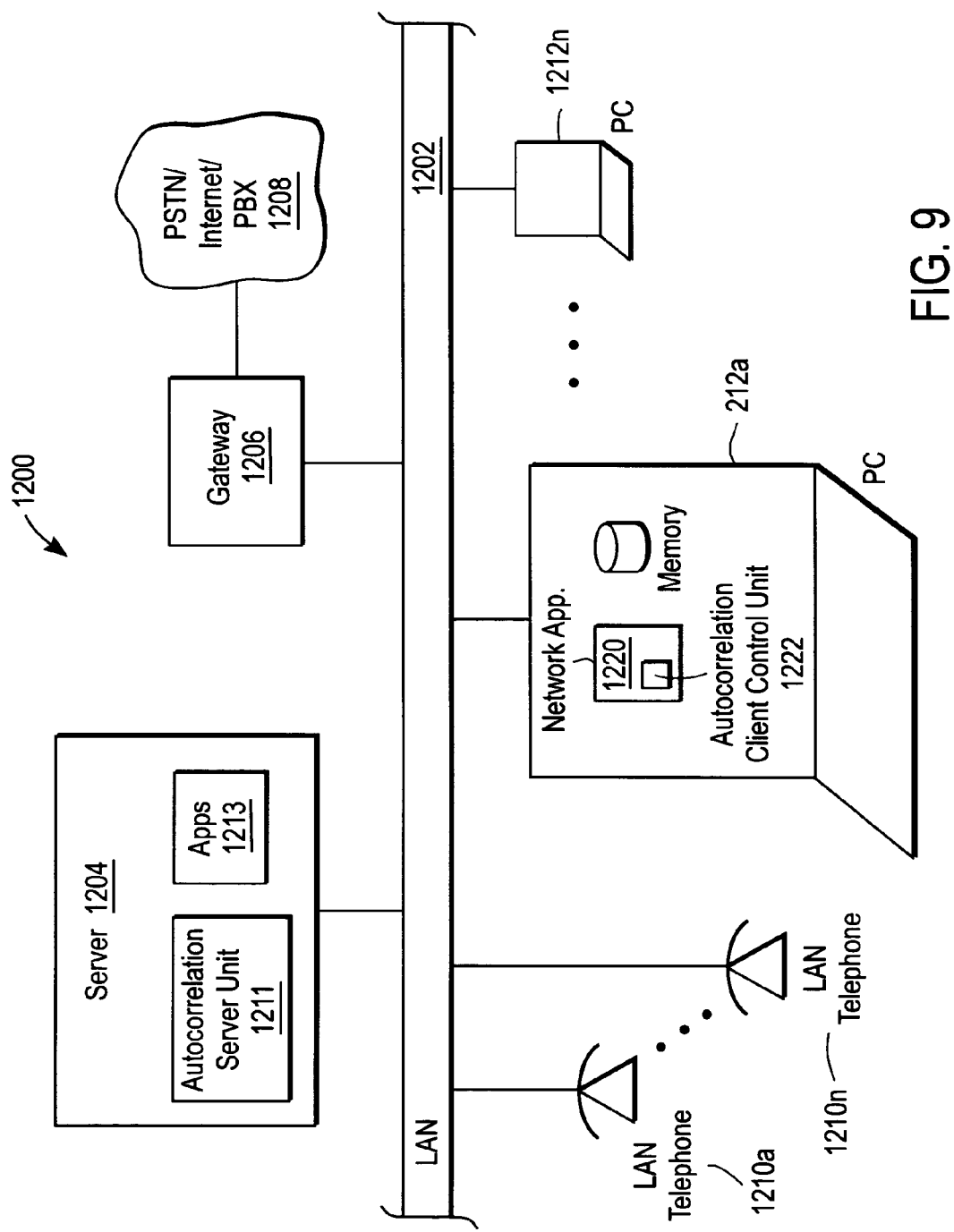
FIG. 9 is a diagram illustrating a telecommunications system according to an embodiment of the present invention.

FIG. 9 illustrates an exemplary enterprise network 1200 including an autocorrelation control system in accordance with embodiments of the present invention. It is noted that, while a particular network configuration is shown, the invention is not limited to the specific embodiment illustrated. As shown, the enterprise network 1200 includes a local area network (LAN) 1202. The LAN 1202 may be implemented using a TCP/IP network and may implement voice or multimedia over IP using, for example, the Session Initiation Protocol (SIP) or ITU Recommendation H.323. Coupled to the local area network 1102 is a multimedia enterprise or presence server 1204.

The server 1204 may include one or more controllers, such as one or more microprocessors, and memory for storing application programs and data (see, e.g., FIG. 3 and FIG. 4). The server 1204 may provide a variety of services to various associated client devices, including telephones, personal digital assistants, text messaging units, and the like. Thus, the server 204 may implement suite of applications 1213 as well as, or including, a autocorrelation server unit 1211, according to embodiments of the present invention.

Also coupled to the LAN 202 is a gateway 1206 which may be implemented as a gateway to a private branch exchange (PBX), the public switched telephone network (PSTN) 1208, or any of a variety of other networks, such as a wireless, PCS, a cellular network, or the Internet. In addition, one or more client endpoints such as LAN or IP telephones 1210a-1210n and one or more computers 1212a-1212n may be operably coupled to the LAN 1202.

The computers 1212a-1212n may be personal computers implementing the Windows XP operating system and thus, running Windows Messenger client (It is noted, however, that other Instant Messaging Programs could be implemented.). In addition, the computers 1212a-1212n may include telephony and other multimedia messaging capabilities using, for example, peripheral cameras, microphones and speakers (not shown) or peripheral telephony handsets. In other embodiments, one or more of the computers may be implemented as wireless telephones, digital telephones, or personal digital assistants (PDAs). Thus, the figures are exemplary only. The computers 1212a-1212n may include one or more processors, such as Pentium-type microprocessors, and storage for applications and other programs. The computers 1212a-1212n may implement network application programs 1220 including one or more autocorrelation client control units or browsers 1222 in accordance with embodiments of the present invention. In operation, the autocorrelation client control units or browsers 1222 allow the client endpoints to interact with the autocorrelation and chat messaging service(s) provided by the server 1204, in a manner similar to that discussed above.

Figure 10:
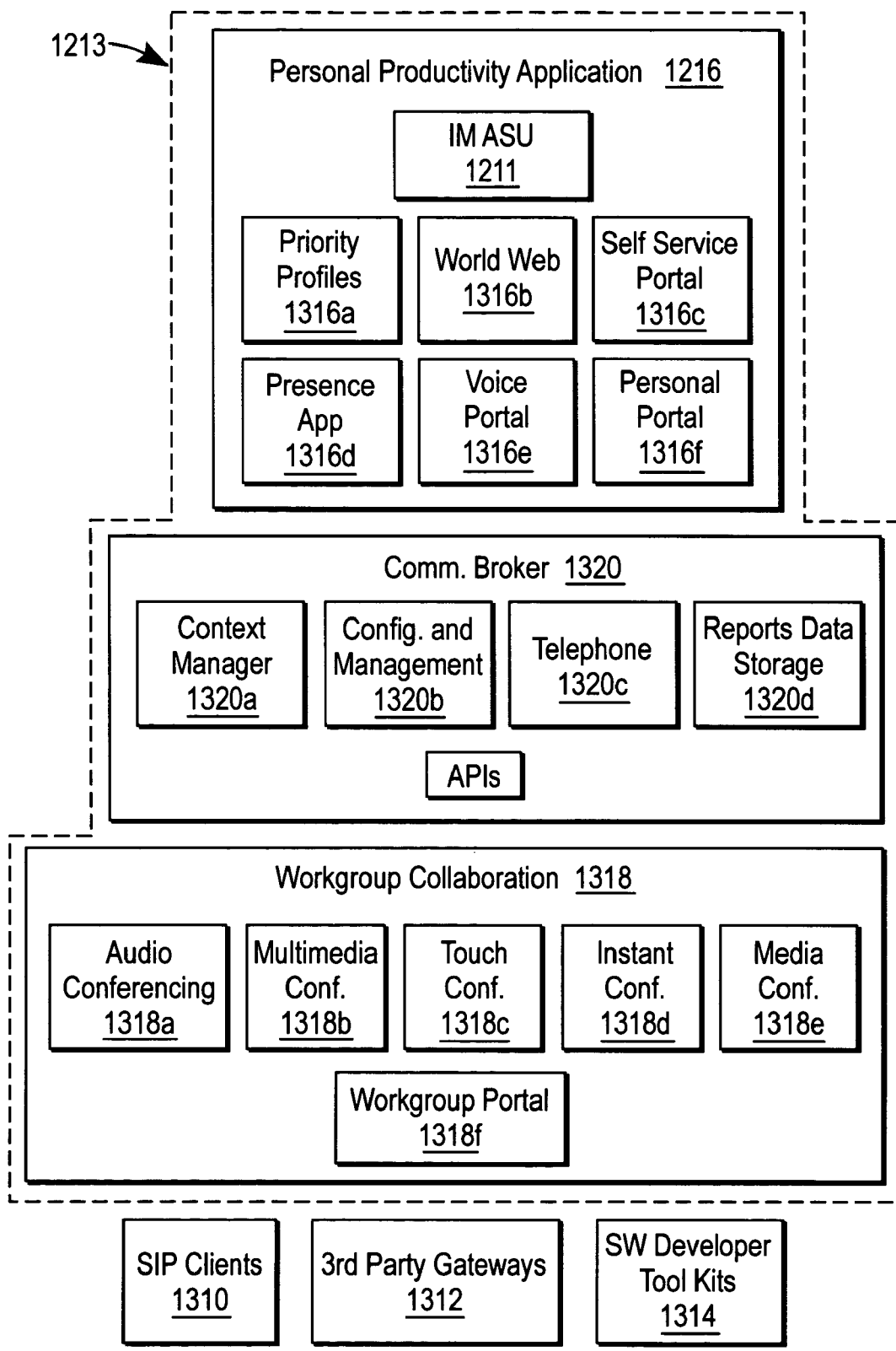
FIG. 10 is a block diagram of a server according to an embodiment of the present invention.

Turning now to FIG. 10, a block diagram illustrating a server 1204 according to embodiments of the invention is shown. As shown, the server 1204 implements a autocorrelation server unit 1211 and a server application suite 1213. In the embodiment illustrated, the multimedia server 1204 also provides interfaces, such as application programming interfaces (APIs) to IP phones/clients 1310, gateways 1312, and software developer toolkits 1314. An exemplary server environment capable of being adapted for use in a system according to embodiments of the present invention is the OpenScape system, available from Siemens Information and Communication Networks, Inc. Such an environment can be implemented, for example, in conjunction with Windows Server, Microsoft Office Live Communications Server, Microsoft Active Directory, Microsoft Exchange and SQL Server.

In the embodiment illustrated, the application suite 1213 includes a personal productivity application 1316, a workgroup application 1318, and a communication broker 1320. The personal productivity application 1316 implements various application modules: priority profiles 1316a, word web 1316b, self-service portal 1316c, chat software/autocorrelation control 1316d, voice portal 1316e, personal portal 1316f, as well as the instant messaging/autocorrelation server unit 1211.

The workgroup collaboration application 1318 implements audio conferencing 1318a, multimedia conferencing 1318b, touch conferencing 1318c, instant conferencing 1318d, media advance 1318e, and a workgroup portal 1318f. The communications broker 1320 implements a context manager 1320a, configuration unit 1320b, telephony features 1320c, reports/data storage 1320d, as well as interworking services.

The personal productivity portal 1318f and workgroup portal 1318f allow a user to access features using a standard Web browser, or via network application plugins.

The priority profiles 1316a provide for handling of a user's communications and initiating specified actions, such as voice calls, e-mails and instant messages. It allows the user to configure personal rules for each status such as "In the Office", "On Business Trip", or "On Vacation;" and allows use of information such as who is calling and the media type to determine an action. The action may include routing to a specific device, routing to the preferred device at the time, sending a notification, and/or logging the transaction.

The presence application 1316d functions as a contact list control unit and allows, through the use of the contact lists, monitoring the status of contacts (e.g., "In the Office," "On Vacation," "Working Remote," etc.); and monitoring the "aggregated presence by media type" for each contact (i.e., whether the contact is accessible by phone, IM, or email).

The Word web 1316b provides a Microsoft Word-based scripting for development of telephony applications. The self service portal 1316c provides guest access to messaging, calendaring, and document retrieval features, such as Voicemail Functions—leave a message, transfer from voicemail; Calendar Functions—schedule/cancel/modify appointments with a subscriber, get email confirmation; and Document Access Functions- authenticate user based on PIN and allow reading, email or fax-back of documents stored in Exchange folders. The voice portal 1316e provides user access to groupware features via the telephone. These can include, for example, Calendar Access functions—accept/decline/modify appointments, block out time; voicemail, email access functions—Inbox access with message sorting options (List total, retrieve (listen), skip, forward, reply, etc.).

In general, default user rules and actions are provided by the system users to specify custom rules and actions using the Personal Productivity Portal 1316f, e.g., an interface to a client browser. During runtime, users can set their Presence State or specify a Preferred Device using either the Personal Productivity Portal 1316f or the Voice Portal 1316d.

The Workgroup Collaboration Portal 1318f, which may be implemented as a browser interface, allows users to initiate audio or multi-media conferencing sessions and view documents that have been checked in to the Workgroup Repository (not shown). The audio conferencing module 1318a and the multimedia conferencing module 1318b allow the user to set up audio or multimedia conference sessions. The Instant Conference module 1318d launches an audio or WebEx multimedia conferencing session, based on contact lists or address book(s). The Touch Conference module 1318*c* allows the user to see the participant list and their presence status. The Media Advance module 1318*e* offers users the point and click option to advance an existing audio conference to a multimedia collaborative session.

The communications broker 1320 provides various communication services. The Context Manager 1320*a* provides user presence/availability states for users, such as "In the Office", "On Vacation", "Working Remote", etc.; and provides device presence and device context for both SIP registered devices and User defined non-SIP devices. In addition, the context manager 1320*a* provides, across the set of devices for a user, aggregated presence by media type, e.g., voice, IM, and email. For example, if a user is accessible by any phone device such as an office phone, a home phone, or a mobile phone; the aggregated presence for the user would indicate accessibility via the media type "telephone." Based on the aggregated presence information for each media type (e.g. available via telephone, not available via IM, available via email), others can choose the best medium of making contact with this user.

The telephony features 1320*c* gives applications access to connection management features via CSTA (e.g. make a call, transfer call, set-up conference, etc.); provides address translation from dialing digits to SIP URL to broker connectivity between telephony devices and soft clients. The Interworking Services provide SIP gateway interworking (e.g., interworking with PSTN and PBX networks). Reports Data Storage 1320*d* provides a repository for system and data reports.

The Context Manager 1320*a* is a service that ties together a view of all users. This view may include the presence and availability of users, the state of users (e.g. in a voice call), each user's collaboration session associations, etc. The result is a detailed view of what the user and their devices are doing at any point in time. This information is used by other network users and system components to make decisions about how to contact the user, as will be described in greater detail below.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. The drawings are not necessarily to scale and illustrate the device in schematic block format. It is intended that the scope of the invention be defined by the claims appended hereto, and their equivalents.

What is claimed is:

1. A method for use in a text chat messaging system in which messages are displayed in chronological order on a message-by-message basis according to chat participants, comprising:

identifying messages in a chat session according to said chat participants;

selectively determining an order of initial participation by said chat participants in said chat session, wherein selectively determining the order is by an autocorrelation unit responsive to selecting autocorrelation at a client endpoint; and arranging a record of said chat session in conversational order by said autocorrelation unit responsive to said order of initial participation, wherein said arranging a record comprises said autocorrelation unit re-arranging messages in a record at said client endpoint out of order from the order at which said messages included in said record arrived at and were created in said client endpoint, said autocorrelation unit re-arranging said messages into said conversational order, wherein when said autocorrelation unit determines there are consecutive messages from the same chat participant said autocorrelation unit bumps said consecutive messages after a next message from another participant in a respective chat session.

2. A method in accordance with claim 1, wherein said arranging a record comprises said autocorrelation unit re-arranging a log of a chat session in said conversational order.

3. A method in accordance with claim 1, wherein arranging said record comprises arranging a display of an ongoing chat session in said conversational order.

4. A method in accordance with claim 3, further comprising signaling other chat participants an indication of an arrangement in said order of initial participation.

5. A method in accordance with claim 4, wherein said chronological order corresponds to the order messages arrive at a server and signaling comprises signaling said server said indication of arrangement.

6. A method in accordance with claim 1, wherein said arranging a record comprises re-arranging messages in a record at a messaging server out of order from the order at which said messages included in said record arrived at said messaging server and into said conversational order.

7. A method in accordance with claim 1, wherein selecting determining the order is by said autocorrelation unit responsive to selecting autocorrelation at a client endpoint and said arranging a record comprises said autocorrelation unit re-arranging messages in a record at said client endpoint out of order from the order at which said messages included in said record arrived at and were created in said client endpoint, said autocorrelation unit re-arranging said messages into said conversational order.

8. A method for use in a text chat messaging system in which messages are displayed in chronological order on a message-by-message basis according to chat participants, comprising:

identifying messages in a chat session according to chat participants; and re-arranging said chat session for display according to a conversation order of participation in said chat session by an autocorrelation unit responsive to selecting autocorrelation at a client endpoint, wherein said arranging a record comprises said autocorrelation unit re-arranging messages in a record at said client endpoint out of order from the order at which said messages included in said record arrived at and were created in said client endpoint, said autocorrelation unit re-arranging said messages into said conversational order, wherein when said autocorrelation unit determines there are consecutive messages from the same chat participant said autocorrelation unit bumps said consecutive messages after a next message from another participant in a respective chat session.

9. A text chat messaging system in which messages are displayed in chronological order on a message-by-message basis according to chat participants, comprising:

a messaging server; and a plurality of network clients defining said chat participants and each including an autocorrelation unit configured to identify messages in a chat session according to chat participants and responsive to receiving autocorrelation selection at a client endpoint, rearrange said chat session for display according to a conversation order of participation in said chat session, wherein said arranging a record comprises said autocorrelation unit rearranging messages in a record at said client endpoint out of order from the order at which said messages included in said record arrived at and were created in said client endpoint, said autocorrelation unit re-arranging said messages into said conversational order, wherein when said autocorrelation unit determines there are consecutive messages from the same chat participant said autocorrelation unit bumps said consecutive messages after a next message from another participant in a respective chat session.

10. A text chat messaging system in accordance with claim 9, wherein said plurality of network clients are adapted to transmit to others of said plurality one or more indicia of a new ordering of said chat session display.

11. A text chat messaging system in accordance with claim 9, wherein said plurality of network clients are adapted to transmit to said messaging server one or more indicia of a new ordering of said chat session display.

12. A text chat messaging system in accordance with claim 9, wherein said plurality of network clients comprise web-browser clients.

13. A text chat messaging device for use in a text chat messaging system in which messages are displayed in chronological order on a message-by-message basis according to chat participants, the device including an autocorrelation unit configured to identify messages in a chat session according to chat participants responsive to selecting autocorrelation at a client endpoint, said autocorrelation unit rearranging said chat session for display according to a conversation order of participation in said chat session, wherein said arranging a record comprises said autocorrelation unit re-arranging messages in a record at said client endpoint out of order from the order at which said messages included in said record arrived at and were created in said client endpoint, said autocorrelation unit re-arranging said messages into said conversational order, wherein when said autocorrelation unit determines there are consecutive messages from the same chat participant said autocorrelation unit bumps said consecutive messages after a next message from another participant in a respective chat session.

* * * * *